United States Patent
Hyndman

(10) Patent No.: US 11,729,292 B1
(45) Date of Patent: Aug. 15, 2023

(54) AUTOMATED CACHING AND CACHE BUSTING

(71) Applicant: International Business Machines Corporation, Armonk, NY (US)

(72) Inventor: Arn Hyndman, Ontario (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/902,242

(22) Filed: Sep. 2, 2022

(51) Int. Cl.
    *H04L 67/564* (2022.01)
(52) U.S. Cl.
    CPC ............................. *H04L 67/564* (2022.05)
(58) Field of Classification Search
    CPC .................................................. H04L 67/564
    See application file for complete search history.

(56) References Cited

U.S. PATENT DOCUMENTS

| | | | |
|---|---|---|---|
| 8,490,077 | B2 | 7/2013 | Miranda-Steiner et al. |
| 9,942,299 | B2 | 4/2018 | Wei et al. |
| 10,033,826 | B2 | 7/2018 | Miller et al. |
| 2015/0195253 | A1 | 7/2015 | Ander et al. |
| 2017/0078432 | A1 | 3/2017 | Miller et al. |
| 2017/0169124 | A1* | 6/2017 | Reshadi ............... G06F 16/176 |
| 2020/0065341 | A1* | 2/2020 | Reshadi ............... H04L 63/0428 |

FOREIGN PATENT DOCUMENTS

| | | |
|---|---|---|
| WO | WO2010/081160 A2 | 7/2010 |
| WO | WO2010/081160 A3 | 7/2010 |

OTHER PUBLICATIONS

Steele, Sam, "Cache Busting with Aspnetcore Taghelpers", https://www.bizstream.com/blog/september-2019/cache-busting-with-aspnetcore-taghelpers, Sep. 1, 2019, 9 pages.

* cited by examiner

*Primary Examiner* — Minh Chau Nguyen
(74) *Attorney, Agent, or Firm* — Stephen J. Walder, Jr.; Aaron Pontikos

(57) ABSTRACT

Mechanisms are provided for promulgating modifications to resources to client devices. A resource is modified and, in response, a new reference to the modified resource is generated along with a mapping that maps a previous reference, prior to the modification, to the new reference of the modified resource. The mapping and interceptor code are injected into an index file of content referencing the resource. The interceptor code intercepts requests referencing the resource and uses the mapping to modify the requests to use the new reference. In response to receiving a request for the content from a client, the index file is transmitted to the client to execute the interceptor code and process references to the resource, in the content, by modifying the references to the resource to direct the retrieval of the resource to the modified resource according to the new reference specified in the mapping data structure.

20 Claims, 4 Drawing Sheets

AUTOMATED CACHING AND CACHE BUSTING

BACKGROUND

The present application relates generally to an improved data processing apparatus and method and more specifically to an improved computing tool and improved computing tool operations/functionality for performing automated caching and cache busting in a wide area network (WAN) computing environment, such as the Internet.

Users of the Internet, or World Wide Web ("web" for short), utilize browser applications on their client computing devices to access content from server computing devices, which host web sites having one or more web pages. These web sites and web pages may be hosted by physical server computing devices that may remotely located from the client computing devices such that there is a delay in accessing the content of these web sites and web pages, where the amount of that delay may be dependent upon how remote the physical machines hosting those web sites and web pages are from the client computing devices accessing them, and the many intermediate computing devices through which the requests for access and responses must be routed.

In order to minimize such delay, web content, e.g., copies of web pages and/or web sites, may be cached. Caching is the process of storing data locally so that future requests for that data can be accessed more quickly. For example, a user's web browser application may have an associated cache for storing web pages and/or web sites so that rather than having to access the web page/site content from the remote server computing devices, the web browser can more quickly render the web page/site content from the locally stored cached copy.

Caches may exist in various computing systems in the WAN computing environment. As mentioned above, caches may be local to the client computing devices, such as in the case of a web browser application cache, or may be in various computing systems between the client computing devices and the remote server computing devices hosting the content, e.g., in proxy servers, reverse proxy servers, and content delivery networks (CDNs), for example.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for promulgating modifications to resources to one or more client computing devices. The method comprises determining that a resource referenced by content has been modified to generate a modified resource, and generating, in response to determining that the resource has been modified, a new reference to the modified resource and a mapping data structure that maps a previous reference to the resource, prior to the modification, to the new reference to the modified resource. The method also comprises injecting, into an index file associated with content referencing the resource, the mapping data structure and interceptor code. The interceptor code, when executed at a client computing device, generates an interceptor that intercepts requests referencing the resource and uses the mapping data structure to modify the intercepted requests to use the new reference to the modified resource. In addition, the method comprises receiving a request for the content from the client computing device, and in response to receiving the request, transmitting the index file to the client computing device to execute the interceptor code and process references to the resource, in the content, by modifying the references to the resource, which correspond to the previous reference, to direct the retrieval of the resource to the modified resource according to the new reference specified in the mapping data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
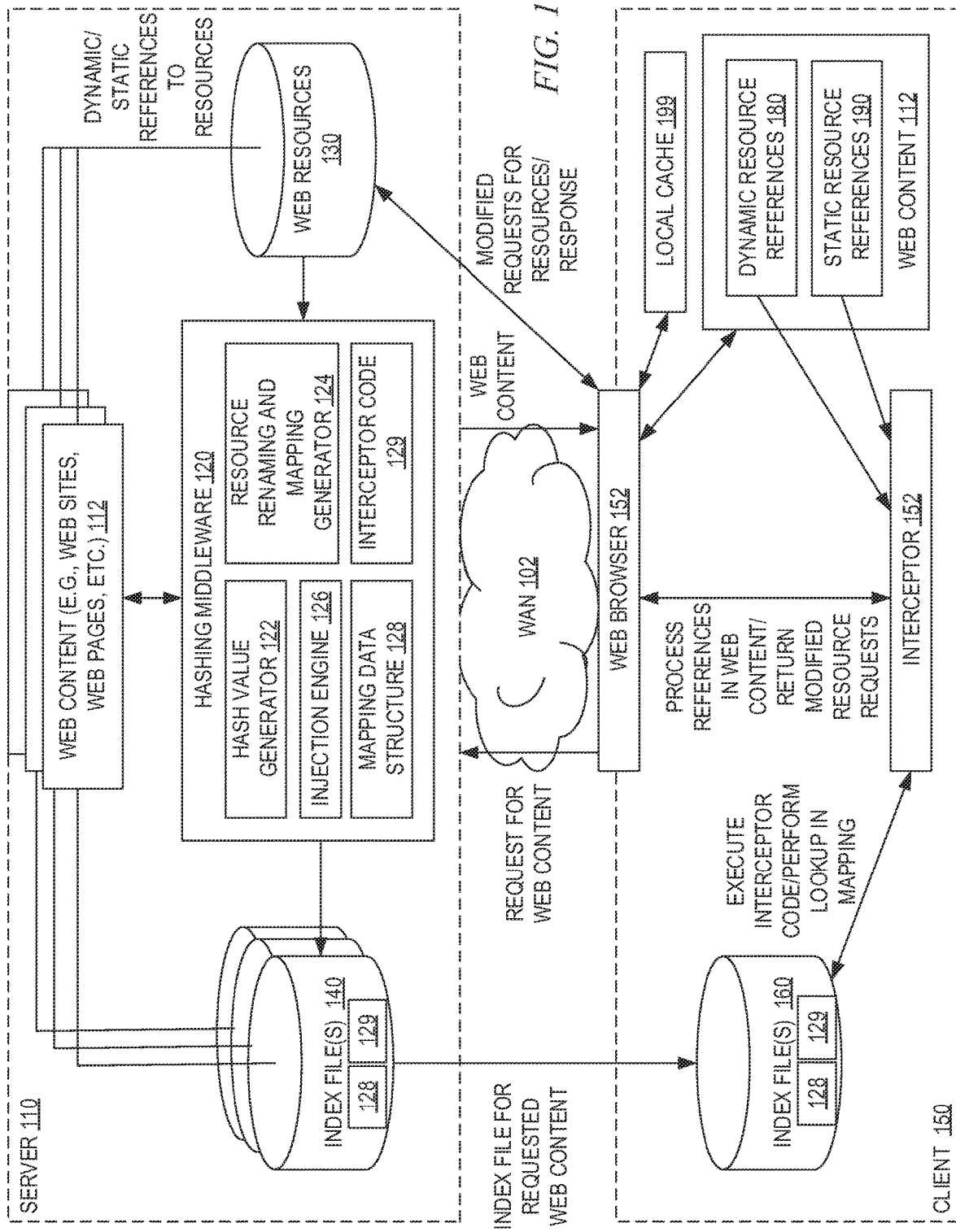
FIG. 1 is an example block diagram illustrating an example interaction of the primary operational components in accordance with one illustrative embodiment.

As noted above, one technique for making access to data faster within a computing environment is to perform caching so that a copy of the data, which may be present on physically remote computing devices, may be stored more local to the client computing devices using that data and thus, can be accessed more quickly from the local copy. However, a problem with such caching mechanisms occurs when the original data is changed and the client computing devices are still utilizing cached copies of the data, which may be out of date. This is especially an issue in distributed data processing systems, such as wide area networks (WANs), the Internet, and the like, where the original data is very remote from the client computing devices and a great many client computing devices may all be storing their own cached versions of the data. The illustrative embodiments provide an improved computing tool and improved computing tool operations/functionality that are specifically directed to providing a solution to this issue as well as other issues existing in the caching of data in distributed data processing systems.

For purposes of the present detailed description of the illustrative embodiments, it will be assumed that the improved computing tool and improved computing tool operations/functionality are implemented with regard to web content on the Internet, and specifically with regard to web caching. Web caching is the caching of web page and/or web site content for quicker access using cache data storage that is either local to the web browser application, or in one or more computing devices, such as proxy servers, reverse proxy servers, or content delivery network (CDN) computing devices, for example, in the distributed data processing environment that cache such data for quicker access by local client computing devices. While the illustrative embodiments will be described in the context of web caching, the illustrative embodiments are not limited to such. Rather, the illustrative embodiments may include embodiments in which the caching is performed with regard to other data other than web pages and/or web site content. Moreover, the illustrative embodiments may include embodiments in which the caching is performed in other computing environments other than the Internet or wide area networks. The various computing environments and data caching with which the mechanisms of the illustrative embodiments may be implemented will be readily apparent to those of ordinary skill in the art in view of the present description and are intended to be within the spirit and scope of the present invention.

As noted above, one problem with web caching is that the original data upon which the cached copies are based may be changed, yet the cached copies may still be considered valid by the client computing devices utilizing those cached copies. That is, with web caching, when web page content and/or web site content (collectively referred to hereafter as "web content") is cached as data structures in the cache storage, such as the client web browser application cache storage, proxy server cache storage, or the like, the source of the web content specifies how long a cached copy of the web content may be stored and still considered valid or "fresh" and useable for subsequent requests for the web content, as opposed to "stale" which indicates that the cached copy of data is no longer valid and cannot be reused for subsequent requests. When the web browser requests web content to be provided from a source computing device, e.g., remote server, the source computing device provides the content along with an "expires" parameter specifying how long any cached version of that content may be maintained in a cache storage.

One example of such an "expires" parameter for controlling duration of web content caching and for specifying when cached web content expires may be "Cache-Control: max-age=604800" which indicates 604,800 seconds, or one week. Another example of this "expires" parameter may be the "expires" parameter in HCL Web Content Manager tags (HCL Web Content Manager is an offering from HCL Software for creating, managing, and delivering content on websites) and URLs that are returned to the client computing device, and which specifies either an absolute date/time or a relative period of time, e.g., EXPIRES="XYZ {date and time}" or "EXPIRES="REL {integer} {units}". The relative period of time may be calculated relative to the time the response forwarding the web content was created, e.g., a timestamp associated with the response to the request from the web browser. In cases where the web content is being stored in a shared cache, such as in a proxy server or the like, it may also be necessary to inform the web browser application of the age of the response so that the expiration time period may be properly calculated. It should be appreciated that the expiration period may also be set to a "no caching" or "no store" setting which indicates that the requested web content cannot be cached.

When the cached version of web content expires, the request for that web content must be sent to the source computing system again to obtain the currently valid original version of the web content, rather than going to the cached version since it has expired and is "stale". This works well when the web page content is not expected to change prior to the expiration time period specified in the responses to the requests, e.g., if the web content is static or if the expiration time period is set to a relatively short time period or to a no caching setting. On one hand, web content providers would like to set the expiry time to be as long a possible for maximum performance (for the end user) and minimum load on the server (as no traffic comes to the server if the content is found in the cache). On the other hand, it is often hard to anticipate when certain resources might need to be updated, e.g., updates due to a product or price being changed, so they would like to have a short expiry so that important changes can be visible right away.

As a result, a problem often occurs when web content that is cached for relatively long periods of time is changed prior to the expiration time period. In such a case, users may use cached versions of web content that have not yet expired and will not see the changed or updated version since the web browsers will not know that the web content needs to be refreshed. In such situations, from both the viewpoint of the end user and the viewpoint of the web content provider, it is undesirable to wait until the expiration time period elapses before performing a web content refresh and obtaining the changed version of the web content. That is, the web content provider wants to have the updated web content used by client computing devices, whereas the client computing devices want to utilize the cached versions of web content as much as possible for performance reasons, but want that cached web content to be "fresh" for as long as possible.

This issue exists for both dynamic references to resources and static references to resources of web content, e.g., dynamically loaded and statically loaded files, data structures, databases, applications, scripts, etc. (collectively referred to as "resources") used to provide elements of the web content, e.g., web page/web site, when the web content is rendered by an appropriate application, such as a web browser application, for example. "Dynamically referenced resources", as the term is used herein, refers to resources, e.g., files, data structures, scripts, applications, etc., used to render web content at a client computing device, where the references in the code of the web content are not static, e.g., javascript may be used to dynamically determine what resource to load and then load the resource either by dynamically editing the HyperText Markup Language (HTML) within web browser memory or by directly loading the resource from code. While the resource itself may be statically stored on a server, the reference to the resource is not static. An example of a dynamically referenced resource may be a web page dynamically loading different resources to match a user's language or region. Thus, "dynamic referenced resources" are those that are dynamically loaded when the web content is rendered and may be different for different client computing devices and/or users. Dynamic resources may be changed frequently. The reference in the web content code, e.g., HTML code, for a dynamically referenced resource may be referred to herein as a "dynamic reference".

"Statically referenced resources", as the term is used herein, refers to resources whose references in the code are not changed without changing the code of the web content itself. Such statically referenced resources are those that are the same for all clients/users, are not changed frequently, and thus, have what is referred to as "fixed content". An example of a static resource in HTML would be <img src="myimage.jpg"> where "myimage.jpg" is simply part of the HTML. The With a dynamically referenced resource version of this example, rather than this static reference to "myimage.jpg", a javascript code would instead execute and use some logic to determine what the name of the image should be that is to be rendered when the web content is rendered via the web browser, for example. The reference in the web content code, e.g., HTML code, for a statically referenced resource may be referred to herein as a "static reference."

One approach to addressing the problem associated with resources changing prior to expiry of cached versions of the resource is to use a technique referred to as cache busting. Cache busting is a technique that circumvents the expiration parameter settings for long term cached web content by providing a mechanism to trigger refreshing the cached web content. Essentially cache busting adds textual content to the Uniform Resource Locator (URL) or other request/response which tells the web browser that a new version of the web content is available. As a result, the web browser application does not retrieve the older version of the web content from the cache storage, but rather makes a request to the source computing system for the new version of the web content. By using cache busting techniques, a web content provider can effectively push their changed/updated web content out to client computing devices without having to wait for the time period to expire for cached content.

While cache busting may provide a technique for forcing an update of web content, cache busting is not used with dynamically referenced resources as the automation on the server cannot determine how to edit the code that dynamically determines the resources to be used to render the web content, e.g., the javascript code. This code can be very complex and thus, it is left to a manual process to determine how to modify the code to implement cache busting, which is very expensive in terms of developer time. As a result, developers in general do not attempt to use cache busting techniques with dynamically referenced resources.

Cache busting can be accomplished in a number of different ways including file name versioning, file path versioning, and query string techniques. For example, for a changed file representing changed web content, using file name versioning, a text string may be added to the file name to indicate that it is a new version of the file, e.g., if the original file was "xyz.css", the string "v2" may be inserted into the file name to indicate a different version of the file, such as "xyz.v2.css". For file path versioning, a string may be added to the file path to specify a new location for the file, e.g., if the original file path was "/xyz.css", then a new version may be specified as located at "/v2/xyz.css". Moreover, with a query string approach, a parameter may be added to the query string to specify a new version, e.g., "xyz.css?ver=2".

As an example, assume that one has a Cascading Style Sheet (CSS) file "xyz.css" referenced in a web page, and which has an associated expiration parameter of 1 year, meaning that once this file is cached at a local cache storage either in the web browser cache of the client computing device, a proxy server shared cache, a reverse proxy server, a CDN cache storage, or the like, the web browsers of client computing devices will look to obtain that file from the cached version rather than sending requests to the original source computing device. As a result, web browsers will not look for updated versions of the file "xyz.css" for an entire calendar year. Now assume that a change is made to the "xyz.css" file 6 months into this time period and the file is stored again under the same name at the source computing device. Web browsers of client computing devices will not know that this file has been changed and will not try to refresh the file in their local caches because the valid time period has not expired for this file yet.

However, if a cache busting technique is utilized, the file's name or path may be modified to force a refresh of the file in the local caches. For example, if the file's name is changed to "xyz.v2.css", and the web page's code, e.g., HTML, is changed to reference this new file name, then the web browser will be informed that there is a new file that should be retrieved and used when rendering the web page through the web browser. As a result, the web browser will send a request to the source computing system for the new file specified in the HTML of the web page rather than using the older locally cached version. In this way, web content providers can make use of longer expiration times on cached web content while being able to push the most recently updated changes of the web content to the end users via their web browsers.

While cache busting provides one option for notifying web browsers that they should retrieve changed or updated web content, it is a brute force technique that is not automated and is not fully supported by current web caching mechanisms. That is, for cache busting to work, the code of the web pages must be manually modified to reference the changed or updated web content. There is no automated mechanism for notifying the client computing devices, e.g., the web browsers, that web content has been changed and that the cached versions of the web content should not be used other than through manual modification of the underlying code of the web pages that reference this web content.

Another option for addressing the problems associated with "stale" cached versions of web content is to use a single index file that is designated as uncacheable. That is, when a web browser requests web content, the web content is sent to the web browser along with an index file specifying the content and content arrangement of the web pages/web site, e.g., what files are part of the web page/web site and how they are organized on the web page/web site. The index file is the file that is automatically loaded and provides the necessary information for loading all the other files required in order to present the web content, e.g., web page/web site, via the web browser.

With the index file approach, the index file contains all the references to the other resources, e.g., files, data structures, databases, applications, scripts, etc., also referred to as "web resources", needed to provide the web content. These references essentially replace the file names (resource names) in the index with hash values such that if the original file (resource) changes, the hash value changes as well. The hash value is a value that is generated by looking at all the content of the resource and summarizing it into a single long value that is guaranteed to produce the same value for the same resource, but is astronomically unlikely to produce the same value if the resource is changed in any way. As a result, there is no need for versioning mechanisms to track the different versions of a resource as this versioning is implemented in the hash value itself. By marking the index file for the web content as "uncacheable", web browsers are forced to retrieve the index file each time they attempt to access the web content through their requests. When the index file is retrieved by the web browsers, the index file has the changed/updated hash value based reference to the resources and thus, the changed/updated resources will be retrieved for rendering the web content.

This solves the problem of allowing one to cache the files with hash names, i.e., references to the resources that incorporate the hash value, indefinitely and yet still be able to get an update whenever required by sending a new index file with a reference to the file with the new hash name. However, the index file approach leads to a new problem in that web pages and web applications, e.g., web browsers, do not naturally look in the index file to find the names of their resources, nor do resources on the server get named with hashes automatically. The index file is discarded after updating static references in the web content code and is not used with dynamically referenced resources, such that web pages and web applications do not use the index file to resolve references to resources. That is, index files for web content are provided in the HTML file for the web content, e.g., web page, and the server code updates all the static references to resources in that HTML file to use the cache busting references, such as those discussed above. If any resource is changed on the web server, the server code will again execute and update the HTML file with the new cache busting references. While this works well for simple web sites that are primarily static content, this performs poorly for more modern web applications that are primarily dynamic.

Currently, in order to generate and deliver hashed files (resources) and index files referencing these hashed files (resources), and then modify all references to those files (resources) to use the index file instead, a large amount of human developer effort is required to modify the server build solution. There is no automated mechanism for doing this time consuming and largely manual process.

The illustrative embodiments provide an automated improved computer tool and improved computer tool operations/functionality that automatically, at the source computing system, e.g., server that is the source of the web content, generates hashed resources (hereafter assumed to be files as a non-limiting example and for ease of description) and the corresponding index file referencing these hashed resources, for both dynamic and static resources of the web content. The improved computing tool and the improved computing tool operations/functionality ensure that web content and web applications that use the references to dynamic and static resources in the web content to render the web content at the client computing devices, use the index file and the hashed resource references to retrieve the dynamic and static resources. In particular, the improved computing tool and improved computing tool operations/functionality specifically provide middleware on the source computing system, e.g., server hosting the web site/web pages and possibly the dynamic/static resources (although these may also be retrieved from other computing devices), that operates to automatically rename resources, e.g., files, based on file hash values, update static references to old file names with new files names, and store a name mapping in the index file that is then used by the client computing device to render the web content at the client computing device, e.g., in the web browser application. The use of such file hash values may be used in some illustrative embodiments as the use of hash values, rather than other versioning mechanisms, does not require a process on the server to compare versions of files to determine if a file has changed in order to give it a new version.

In addition, the middleware operates to insert into the index file, interceptor code that is executed by client computing devices when accessing the index file and which implements an interceptor on the client computing device that is specifically configured to intercept dynamic resource references in the rendering of web content. The interceptor code automatically intercepts references to resources in the web content, e.g., specified in the index file, and maps the references to the new resource names generated by the hashing middleware of the source computing system when updating the index file. Thus, the interceptor code forces the client computing device to use the index file to retrieve resources for rendering the web content, and the index file contains a mapping of the old resource references to the new resource references, e.g., hash values, such that the interceptor can lookup the new resource references and retrieve the resources based on the new resource references by executing corresponding requests to the source computing system or other computing system storing the requested resource. This can be performed for both dynamic and static resources.

Thus, assume an example of a web client computing device being a computing device requesting web content, such as a web page having various dynamic and/or static resource references to web resources for rendering the web page, and a web server computing device that stores or "hosts" the web site with which that web page is associated. In accordance with the illustrative embodiments, the web server is configured with hashing middleware that operates, in response to a modification of a web resource in its backend resource data storage, to rename resources to their hashed names and attach appropriate cache headers or metadata, e.g., a cache expiration time header/metadata that specifies an expiration parameter as a time/date or a duration of a particular amount of time. For purposes of this example, it is assumed that this expiration time is a relatively long period of time within computing systems, such as 1 year or the like.

The hashing middleware performs such renaming with regard to dynamic and static resources and generates a mapping data structure that specifies a mapping between the old name(s) and the new name for each of these resources. The hashing middleware updates the index file for the web page to include the mapping data structure. In addition, the hashing middleware is configured to inject interceptor code into the index file that is executed by the client computing device, e.g., via its web browser application, when the index file is used to render the web page. The interceptor code causes the client computing device to be configured to provide an interceptor that intercepts references to web resources and performs a lookup of the mapping of the references in the mapping data structure to determine the current name for that resource and execute a request for the resource using the current name for that resource.

Thus, when a web content provider changes a web resource stored on a web server, the change causes a new hashed name to be generated and stored in the mapping data structure in the hashing middleware, mapped to the old hashed name for that web resource, and/or the original name for the web resource. In some embodiments, the new hashed name is mapped only to the original name for the web resource and does not need to maintain previous hashed names for modified versions of the web resource, while in other illustrative embodiments, the mapping may be between a previous hashed name and the currently hashed name, the original name, or any combination. This mapping data structure is provided in the index file for the web page. The web client, when requesting the web content of the web page, is provided with the index file, which also has the injected interceptor code. Thus, as the web client's web browser attempts to render the web page, references to web resources are encountered and requests are sent to the web server to retrieve those web resources. These requests are intercepted by the interceptor executing in the web client due to the execution of the injected interceptor code. The interceptor performs a lookup of the web resource name, which is a hashed name, and performs any mapping based on the mapping data structure to generate a modified request that references the currently valid web resource hashed name. This request is sent to the web server which then retrieves the correct version of the web resource as the correct version is tied to the currently valid hashed named. The correct version of the web resource is then returned to the web client which uses it to render the web page at the client computing device.

For web resources that do not have a mapping specified in the mapping data structure, the client computing device may first look to a local cache, which may be a cache associated with the client computing device, a proxy server cache, a CDN cache, a reverse proxy cache, etc. In some cases, the search for the cache may include first looking to the web browser cache, then looking to a proxy cache, then looking to a CDN, then a reverse proxy cache, and finally going to the source computing system, e.g., web server, to obtain the web resource. Thus, cached versions of web resources may be utilized to render the web content at the client computing device when those web resources have not been changed, and thus do not have a mapping in the mapping data structure, and when the cached version of the web resource is valid, i.e., not "stale" or expired.

In one illustrative embodiment, the interceptor may use tools provided in the programming language of the interceptor code to detect when resources are modified, e.g., in javascript tools may be used to determine when a Document Object Model, e.g., the HTML of a web resource, is modified. The interceptor may register as an observer with such tools and thus, may be invoked anytime the web resource is changed, e.g., the HTML document of the web resource is modified. The interceptor can then inspect the changes to see if any resource names were adjusted/added and thus lookup these new resource names in the index for possible replacement. For direct resource loading, e.g., XHLHTTPRequest and Fetch functions, the interceptor can overwrite the implementation of the appropriate methods such that interceptor code runs, captures the resource name, and looks up the resource name in the index for replacement, and then after resource name modification, calls through to the original function.

Thus, with the mechanisms of the illustrative embodiments, rather than having to perform a large amount of manual effort to implement cache busting mechanisms each time a change is made to a web resource, a developer need only enable the hashing middleware of the illustrative embodiments with their web content. The hashing middleware mechanisms will automatically provide the necessary automated mechanisms to map old hashed names of web resources to new hashed names of web resources, integrate this mapping into the index file for the web page/web site, and inject interceptor code for client computing devices to automatically execute when rendering the web page/web site (web content). The client computing device will automatically execute the interceptor code to generate a client side interceptor that intercepts requests for web resources and automatically performs a lookup of the currently valid hashed names for the web resources and send modified requests for these web resources using the currently valid hashed names to the web server. This greatly reduces the manual effort needed to implement a cache busting mechanism, such as the index based mechanisms described above, reduces sources of potential human error, and provides a substantially automated mechanism for handling changes or updates to web resources. Developers are free to use any long expiration time periods for their caching expiration time periods, yet may be assured that if updates/changes to web resources are performed prior to the expiration time period of these cached versions, the updated/changed versions of the web resources will be automatically used by client computing devices due to the mechanisms of the illustrative embodiments.

The illustrative embodiments provide an improved computing tool and improved computing tool operations/functionality that are the first to provide an automated server-side middleware that solves the problems associated with cached versions of web content and, with regard to one or more illustrative embodiments, provides an improvement in index based cache busting mechanisms. These improvements may also be realized with other cache busting mechanisms that may not be tied to indices specifically, with minor changes, as will be readily apparent to those of ordinary skill in the art. For example, as long as there is a mechanism by which a mapping of the old hashed name for a web resource to a new hashed name for the web resource is provided to client computing devices when rendering the web content, and interceptor code is executed to intercept requests for web resources and use the mapping to determine the current valid hashed name for the web resources, then such embodiments are intended to be within the spirit and scope of the present invention.

It should also be noted that while the illustrative embodiments are described with regard to inserting the mapping data structure and interceptor code in an index file of the web content, other mechanisms for providing the mapping data structure and interceptor code may be utilized without departing from the spirit and scope of the present invention. For example, in some illustrative embodiments, the mapping data structure and/or interceptor code may be embedded into the file loaded when the web browser first attempts to load the web content. That is, the HTML file, for example, that is loaded by the web browser first in order to render the web content may have instructions embedded into the HTML file to retrieve the mapping data structure and/or implement the interceptor immediately after the HTML file is loaded. Other mechanisms that facilitate the accessing, by the client computing device, the mapping data structure and interceptor code may be used without departing from the spirit and scope of the present invention.

The improved computing tool and improved computing tool operations of the illustrative embodiments are the first to leverage server-side automated middleware to provide an automated mapping and interceptor for ensuring that changed/updated web resources are utilized by client computing devices to render web content. Even if existing computing systems were to provide web content indices and hashing of web resource names, these mechanisms would require a large amount of manual effort to modify the web content itself to use the new hashed web resource names once the web resource is changed/updated, and such manual effort has to be engaged in each time the web resource is changed/updated. This is especially problematic for web resources that are cached in local caches for relatively long periods of time and changes/updates may be made before the expiration of such time periods. There is no mechanism for automatically enabling the use of the most recent versions of web resources without manual modification of the web content. Thus, the improved computing tool and improved computing tool operations are specifically directed to improvements over existing technological processes.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As described above, the illustrative embodiments of the present invention are specifically directed to an improved computing tool that automatically generates mappings between old and new hashed resource names (or references), inserts them into an index file for web content, and injects interceptor code that is executed by a client computing device that uses the index file to render the web content. The interceptor code executes on the client computing device to automatically intercept requests for resources and map the names in the requests to the currently valid hashed resource name and modify the requests to use the currently valid hashed resource name. All of the functions of the illustrative embodiments as described herein are intended to be performed using automated processes without human intervention. While a human being may be the initiator of a request for web content via their web browser, and may be the ultimate viewer or consumer of the web content that is rendered at the client computing device via their web browser, the illustrative embodiments are not directed to any interactions by the human being themselves. To the contrary, the illustrative embodiments are directed to the automated operations/functionality and mechanisms of the hashing middleware, interceptor, and the like, that operate automatically and independently of any inputs from the human user or outputs to the human user. Thus, the illustrative embodiments are not organizing any human activity, but are in fact directed to the automated logic and functionality of an improved computing tool.

FIG. 1 is an example block diagram illustrating an example interaction of the primary operational components in accordance with one illustrative embodiment. The example shown in FIG. 1 assumes a client-server environment in a wide area network (WAN) such as the Internet. For purposes of illustration, references will be made to "web" client, "web" server, "web" content, etc., as this example of the illustrative embodiments is with regard to the World Wide Web. This example is chosen for ease of explanation of how the mechanisms of one or more illustrative embodiments operate, and is not intended to be a limitation to the possible illustrative embodiments. To the contrary, the mechanisms of the illustrative embodiments may be implemented in other environments not involving the World Wide Web or Internet, and in situations where a specific client-server environment is not utilized. Any environment in which caching of resources may result in cached versions of that resource becoming stale prior to an expiration time of the cached version, such as due to an update/change to the original version of the resource prior to the expiration time of the cached version, may make use of the mechanisms of the illustrative embodiments without departing from the spirit and scope of the present invention.

In the example shown in FIG. 1, a client computing device 150 (or "client") communicates via a web browser application 152 and one or more data networks 102, with a server computing device 110 (or "server") in order to access and obtain web content 112, which may be accessing a web site, a web page of a web site, or the like. The server 110 may store or "host" many different instances of web content for different web sites, web pages, etc., with the web content 112 being only one of those stored/hosted instances of web content. The web content 112 may have an associated index file 140 for that web content 112 and may make reference to one or more web resources 130, such as files, data structures, databases, applications, scripts, etc., which may be dynamic resources and/or static resources. The referenced web resources 130 in the web content 112 may be identified in the index file 140 for that web content 112. Thus, when a client 150, via their web browser 152, requests the web content 112, the server 110 will respond with the index file 140 for that web content 112 and the web browser 152 will attempt to render the web content 112 by requesting the referenced web resources 130 from the server 110 in accordance with the index file 140 and the code of the web content 112.

In accordance with the illustrative embodiments, the server 110 is configured with hashing middleware 120 that operates to provide various automated computer functionality with regard to hashing names of resources, and mapping hashed names of resources, as well as injecting interceptor code into indices of web content, such as index 140 of web content 112. The hashing middleware 120 comprises a hash value generator 122, a resource renaming and mapping generator 124, and an injection engine 126. The hash value generator 122 comprises logic that automatically generates hash values representing the content of a web resource 130 such that the web resource may be represented by the hash value in an immutable manner, i.e., any changes to the content of the web resource will cause a change in the hash value such that if the hash value of a changed web resource is compared to a hash value for a previous version of the web resource, the hash values will not match. The resource renaming and mapping generator 124 comprises logic that automatically renames resources referenced in index files 140 of web content 112 based on the hashed values generated by the hash value generator 122. The resource renaming and mapping generator 124 also operates to generate a mapping data structure that maps old resource names to new resource names, where the new resource names are based on the hashed values of the resources as generated by the hash value generator 122. The injection engine 126 comprises logic for automatically inserting the mapping data structure generated by the resource renaming and mapping generator 124 into the corresponding index file 140 for the web content 112 and also inject interceptor code that generates an interceptor at the client 150 when the index file 140 is used to render the web content 112 via the web browser application 152.

To illustrate the operation of the hashing middleware 120, in accordance with some illustrative embodiments, consider a situation where web content 112 has been stored in the server 110 for access by clients 150 via their web browser applications 152 and the one or more data networks 102, and that this web content includes references to one or more web resources 130. For example, the web content 112 may be a web page of a web site and may reference certain dynamic/static resources including a newsfeed data source, certain images, backend databases having data that may be represented in different ways in the web page, e.g., as graphs, etc., and the like. The references to the web resources 130 in the web content 112 may have associated expiration time parameters specifying how long the web resources 130 may be cached in local caches of the client 150 and/or other computing devices in the data network(s) 102. As a result, if a client computing device 150 has accessed the web content 112, they may have a locally cached version of one or more of the web resources 130 referenced by the web content 112 and may look to the locally cached version in subsequent access requests for the web content 112, should the present invention not be implemented. Thus, one may modify or update the web resources 130 and non-expired cached versions of the previous state of the web resource 130 would still be utilized by clients 150 when subsequently rendering the web content 112, rather than retrieving the modified/updated versions from the web resources 130 data storage at the server 110.

However, with the mechanisms of the illustrative embodiment, when a developer modifies or updates web resources 130, the developer or server code, e.g., web resource database code or the like, through which the modifications/updates are performed and/or persisted, notifies the hashing middleware 120 of the modification/update. The hashing middleware 120, which is software acting as a bridge between the backend database of web resources 130 and applications or the one or more data networks 102, invokes the hash value generator 122 to generate a hash value based on the modified/updated content of the modified/updated web resource 130. It should be appreciated that while the illustrative embodiments show a backed database of web resources 130, this is only one example implementation. The illustrative embodiments may operate with any mechanism for storing web resources. Moreover, the resources need not be "renamed" and may instead utilize aliases, i.e., have a soft link or other mechanism that allows the resource to be accessed by the new name or reference, potentially in addition to the original name or reference.

This hash value is used to represent the web resource 130 in one or more index files 140 of one or more of the web content 112 that reference the web resource 130. The hashing middleware 120 further invokes the resource renaming and mapping generator 124 to utilize the hash value generated by the hash value generator 122 to rename the resource 130 in the index file 140 to be a hashed name based on the hash value, e.g., a string of characters and/or numerical values that uniquely represent the content of the resource. The resource renaming and mapping generator 122 further automatically generates a mapping data structure, or an entry in an existing mapping data structure for the web content 112, that maps any old resource name to the new hashed resource name that is based on the hash value generated by the hash value generator 122. The old name may be a previously generated hashed resource name for a previous version of the web resource 130, a file name, or any other identifier of the web resource 130. The mapping data structure 128 comprises the entries for the various web resources 130 that are referenced by the web content 112. The generated mapping data structure 128 may be inserted into the index file 140 associated with the web content 112.

In addition, the hashing middleware 120 invokes the injection engine 126 to inject interceptor code 128 into the index file 140 for the web content 112. The interceptor code 128, when executed at the client 150 to render the web content 112 via the web browser 152, intercepts requests for web resources that are directed either to the local cache in the client 150, a cache in a more local computing device of the one or more data networks 102, such as a proxy server, reverse proxy server, CDN cache storage, or the like, or to the server 110. That is, when the web browser 152 processes the web content 112, which may include dynamic resource references 180 and static resource references 190, when the web browser 152 encounters these references 180, 190, the resulting requests for the referenced web resources are intercepted by the interceptor 170.

The intercepted requests are processed by the interceptor 170 generated by the execution of the interceptor code 129 in the index file 140, to identify the reference, e.g., resource name, of the web resource 130 requested and automatically perform a lookup operation in the mapping data structure 128 of the index file 140. The lookup operation searches the mapping data structure 128 for a mapping of the reference in the request to a new resource name, e.g., hashed resource name. If a matching entry is found in the mapping data structure 128, then the request is modified by the interceptor 170 to reference the new resource name, e.g., hashed resource name, as opposed to the old resource name. The modified request may look for the web resource 130 in a local cache or cache of an intermediate computing device, but because the hash value is specific to the modified/updated web resource 130, a matching resource name will not be found in these caches, i.e., the previously cached version will have a different resource name. As a result, the request will be then sent to the server 110 to retrieve the currently valid version of the web resource 130.

Thus, regardless of whether there is a cached version of the modified/updated web resource 130 present in a local cache associated with the client 150, the index file 140 and interceptor 170 of the illustrative embodiments forces the client 150 and web browser 152 to look to the index file 140 for the web resources 130 referenced by the web content 112. As the index file 140 comprises the mapping to the currently valid resource name, e.g., the currently valid hashed name, for the web resource 130, and comprises logic to modify requests for web resources 130 to use the currently valid resource name, the most current versions of web resources 130 will be accessed from the source computing device storing the web resource 130, such as server 110, for example. In the case of web resources 130 that have not been changed/updated since the last cached version, the web browser 152 may look to the local cache or cache of an intermediate computing device for the web resource 130 and if there is a matching copy or version of the web resource 130, that copy or version will be used to render the web content 112 at the web browser 152 rather than having to go to the source computing device, e.g., server 110.

Thus, a developer may utilize relatively long expiration times for web resources, yet still ensure that if web resources are modified or updated prior to expiration of cached versions of the web resource, the most current valid version will be automatically retrieved and utilized by clients 150 when rendering the web content 112. The hashing middleware 120 provides an automated computing tool that automatically detects or is informed when web resources 130 are updated/modified and automatically generates hashed names for these resources based on hash values of the contents of these modified/updated web resources 130 and inserts a mapping data structure 128 to specify the mapping of old resource names to the new hashed resource name. In addition, the hashing middleware 120 injects interceptor code 129 that forces client computing devices to look to the index file 140 for references to web resources and thereby utilize the mapping data structure to request web resources. The interceptor code 129 is executed to cause the client 150 to implement an interceptor at the client-side which intercepts references to web resources and either retrieve those web resources from a local cache if the web resource has not been updated, or from a source computing system, e.g., server 110, if the web resource has been modified/updated.

Figure 2:
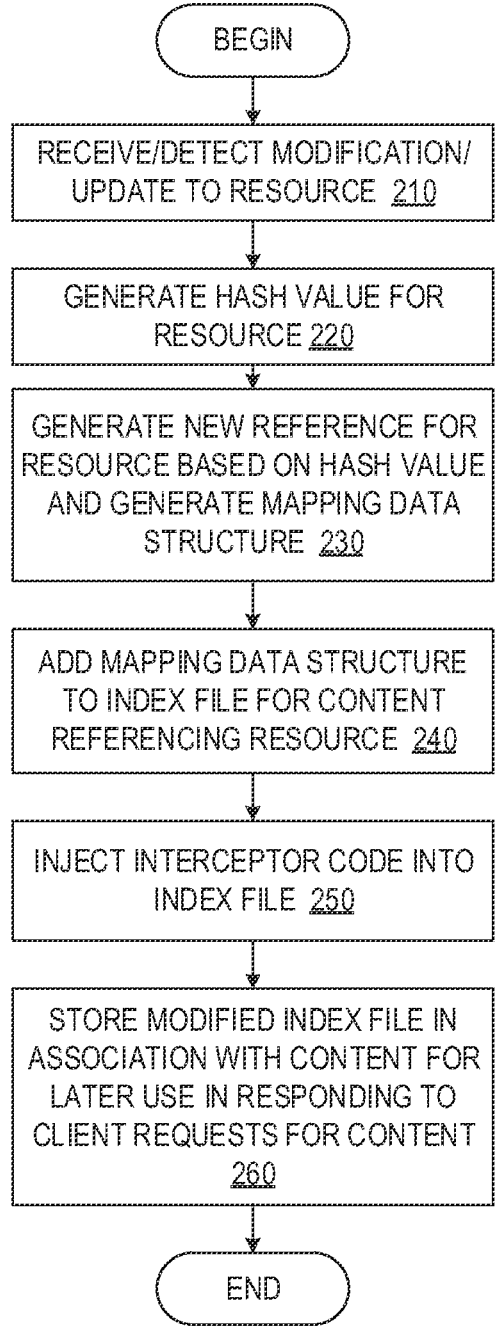
FIG. 2 is an example flowchart outlining an example operation of a hashing middleware tool in accordance with one illustrative embodiment.
Figure 3:
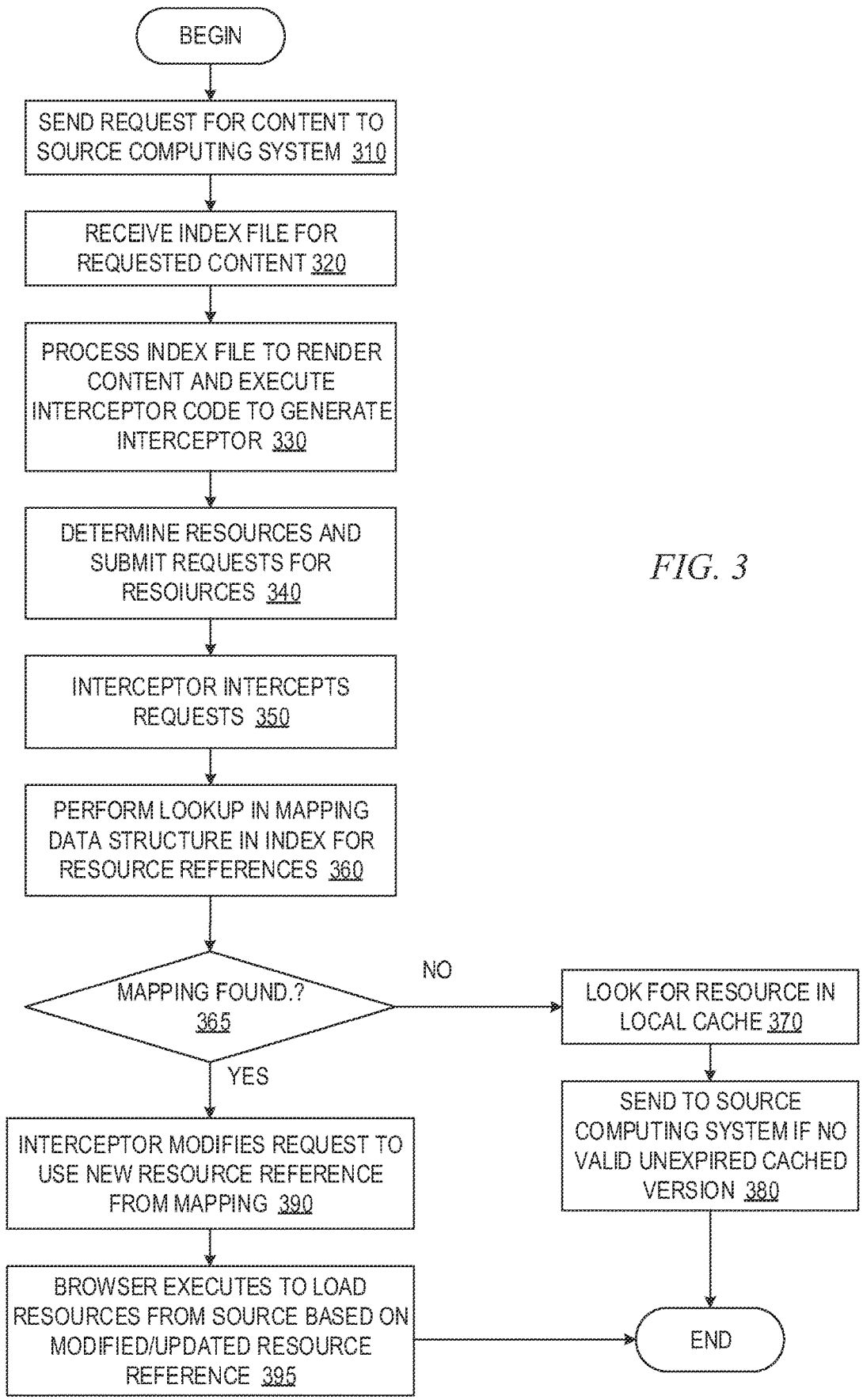
FIG. 3 is an example flowchart outlining an example operation of an interceptor in accordance with one illustrative embodiment.

FIGS. 2-3 present flowcharts outlining example operations of elements of the present invention with regard to one or more illustrative embodiments. It should be appreciated that the operations outlined in FIGS. 2-3 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 2-3, and may, in some cases, make use of the results generated as a consequence of the operations set forth in FIGS. 2-3, the operations in FIGS. 2-3 themselves are specifically performed by the improved computing tool in an automated manner.

FIG. 2 is an example flowchart outlining an example operation of a hashing middleware tool in accordance with one illustrative embodiment. The operation outlined in FIG. 2 may be automatically performed by hashing middleware executing in a source computing system, such as a server or the like, in a wide area network (WAN) or other distributed data processing system. For purposes of explanation with regard to FIGS. 2 and 3 hereafter, it is assumed that the operation is performed by a server in the Internet that hosts one or more web sites with one or more web pages providing web content to users of web browsers at client computing devices.

As shown in FIG. 2, the operation starts by receiving or detecting a modification/update to a web resource associated with stored/hosted web content (step 210). A hash value for the web resource is generated by hashing the contents of the modified/updated web resource (step 220). The hash value is then used as a basis for generating a new reference, e.g., file name, resource name, etc., for the web resource and a mapping data structure specifying a mapping of the previous reference to the hashed value based reference, e.g., hashed name (step 230). The mapping data structure is then added to the index files of web content referencing the previous reference of the web resource (step 240). Interceptor code is also injected into the index files of the web content that has been updated with the mapping data structure (step 250).

The modified index file is then stored for later use when receiving a request for the corresponding web content from client computing devices (step 260). The operation then terminates.

FIG. 3 is an example flowchart outlining an example operation of an interceptor in accordance with one illustrative embodiment. The operation outlined in FIG. 3 may be automatically performed by a web browser application or other client-side application that is configured to execute an index file for web content, and in accordance with the illustrative embodiments, in doing so generate an interceptor that operates to intercept references to web resources.

As shown in FIG. 3, the operation starts by sending a request for web content to a source computing system via a web browser and one or more data networks of the WAN, the Internet, or the like (step 310). The index file for the requested web content is received from the source computing system, where this index file includes a mapping data structure and injected interceptor code in accordance with the mechanisms of one or more of the illustrative embodiments (step 320). The index file is processed by the web browser to render the web content and in so doing executes the interceptor code to generate a local interceptor executing on the client computing device (step 330). The processing of the index file further involves determining from the index file the web resources need to render the web content and then submitting requests to source computing device(s) for these web resources (step 340). The requests are intercepted by the interceptor at the client computing device (step 350) and a lookup operation is performed in the mapping data structure of the index file to determine if there is a mapping of the web resource reference in the request to a new web resource reference, e.g., a hashed resource reference (step 360). If there is no mapping (step 365: NO), the request for the web resource is first processed to determine if there is a valid non-expired cached version of the web resource in a local cache and if so, load the resource from the valid non-expired cached version (step 370). This may involve performing lookups in multiple cache storage systems, such as a browser cache, proxy server cache, CDN, etc. If there is no valid non-expired cached version of the web resource, the request is forwarded on to the source computing system from which the web resource is retrieved (step 380). If there is a mapping to a new web resource reference (step 365: YES), then the interceptor modifies the request to utilize the new web resource reference rather than the previous web resource reference (step 390). Once modified to utilize the new web resource, the client computing device looks for the new web resource reference in the local cache, proxy cache, CDN, etc., and assuming no valid non-expired version of the web resource is found corresponding to the new web resource reference, forwards the modified request to the source computing system(s) in order to obtain the web resource from the source computing system(s)(step 395). The operation then terminates.

Thus, the illustrative embodiments provide an automated improved computing tool that solves the technological problems associated with caching web content and web resources for long periods of time while permitting modifications/updates of those web resources to be promulgated to clients prior to the expiration time of these cached versions of the web content and web resources. The illustrative embodiments provide mechanisms that force client computing devices to utilize index files for the web content to determine the web resources needed to render the web content, such that the index file may be used as a basis for ensuring that modified/updated web resources are utilized despite expiration times of cached versions of these web resources. Mechanisms are provided for automatically intercepting requests for web resources at the client side and modifying these requests to utilize references to the modified/updated web resources rather than older cached versions of the web resources.

As mentioned previously, the present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides hashing middleware on a source computing system, e.g., server, or the like, which modifies an index file for web content to include a mapping data structure to map old resource references to new resource references when the resources have been modified/updated, and to inject interceptor code into the index file that utilizes this mapping data structure when intercepting requests for resources at the client-side. The improved computing tool implements mechanism and functionality, such as the hashing middleware and the interceptor, which cannot be practically performed by human beings either outside of, or with the assistance of, a technical environment, such as a mental process or the like. The improved computing tool provides a practical application of the methodology at least in that the improved computing tool is able to provide an automated mechanism to circumvent expiration times of cached versions of web content and web resources to ensure that modified/changed web content and web resources are pushed to client computing devices prior to the expiration of the locally cached versions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As touched upon above, a computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code involved in performing the inventive methods, such as the hashing middleware 120 (in the remote server 404) and/or interceptor 170 (in the client computer 401) in FIG. 1. In addition, the client computer 401 may execute a web browser 152 and may process index files for requested web content 140, which includes injected interceptor code and mapping data structures in accordance with one or more of the illustrative embodiments as described previously.

In addition to block 120, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 200, as identified above), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 200 in persistent storage 413.

Communication fabric 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface type operating systems that employ a kernel. The code included in block 200 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

Figure 4:
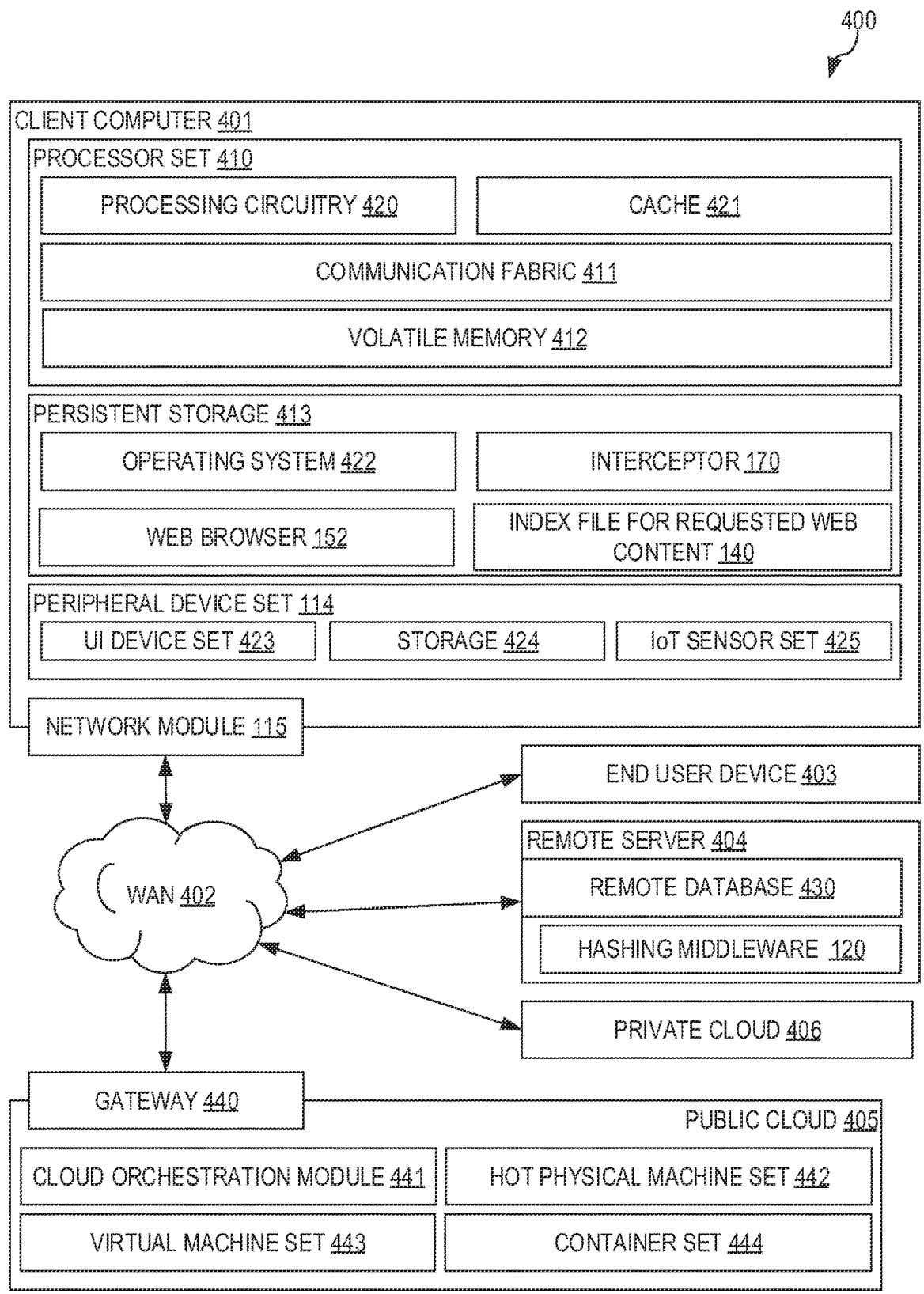
FIG. 4 is an example diagram of a distributed data processing system environment in which aspects of the illustrative embodiments may be implemented and at least some of the computer code involved in performing the inventive methods may be executed.

As shown in FIG. 4, one or more of the computing devices, e.g., computer 401 or remote server 404, may be specifically configured to implement hashing middleware that modifies index files for web content to include mapping data structures and interceptor code, where this interceptor code, when executed at the client-side, configures the client side to implement an interceptor that intercepts requests for resources to render web content. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 401 or remote server 404, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates automated interception of requests for web resources required to render web content at the client computing devices so that these requests will reference any modified/updated versions of the web resources and retrieve these modified/updated versions of the web resources from the source computing devices rather than utilizing stale cached versions of the web resources that have not yet expired.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for promulgating modifications to resources to one or more client computing devices, the method comprising:
   determining that a resource referenced by content has been modified to generate a modified resource;
   generating, in response to determining that the resource has been modified, a new reference to the modified resource and a mapping data structure that maps a previous reference to the resource, prior to the modification, to the new reference to the modified resource;
   injecting, into an index file associated with content referencing the resource, the mapping data structure and interceptor code, wherein the interceptor code, when executed at a client computing device, generates an interceptor that intercepts requests referencing the resource and uses the mapping data structure to modify the intercepted requests to use the new reference to the modified resource;
   receiving a request for the content from the client computing device; and
   in response to receiving the request, transmitting the index file to the client computing device to execute the interceptor code and process references to the resource, in the content, by modifying the references to the resource, which correspond to the previous reference, to direct the retrieval of the resource to the modified resource according to the new reference specified in the mapping data structure.

2. The method of claim 1, wherein generating the new reference to the modified resource comprises generating a hash value of contents of the modified resource and generating the new reference based on the hash value.

3. The method of claim 2, wherein the new reference is a hashed file name comprising the hash value.

4. The method of claim 1, wherein at least one of the references to the resource in the content is a dynamic reference to the resource, and wherein the dynamic reference is a reference whose corresponding resource is not statically fixed.

5. The method of claim 4, wherein the dynamic reference comprises javascript logic in the content that dynamically determines the resource to retrieve to provide a corresponding portion of the content.

6. The method of claim 4, wherein the content is a web page, and wherein the resource is one of a file, data structure, database, application, or script that provides a portion of the content.

7. The method of claim 1, further comprising:
   in response to the client computing device receiving the index file, executing the interceptor code to generate the interceptor; and
   processing, by the client computing device, the content to render the content at the client computing device, wherein processing the content comprises, for at least one reference to one or more resources found in the content, intercepting, by the interceptor, a corresponding request for the resource and determining, by the interceptor, whether to look for cached versions of the resource or retrieve the resource from a source computing system.

8. The method of claim 7, wherein the interceptor determines whether to look for cached versions of the resource or retrieve the resource from a source computing system at least by:
performing a lookup of the at least one reference in the mapping data structure of the index file to determine if there is a matching entry in the mapping data structure;
in response to no mapping being found for the at least one reference, performing an operation to determine if there is a valid non-expired cached version of the at least one resource in one or more cache storages associated with the client computing device; and
in response to no valid non-expired cached version of the at least one resource being found in the one or more cache storages, forwarding a request for the at least one reference to the source computing system.

9. The method of claim 7, wherein the interceptor determines whether to look for cached versions of the resource or retrieve the resource from the source computing system at least by:
performing a lookup of the at least one reference in the mapping data structure of the index file to determine if there is a matching entry in the mapping data structure;
in response to a mapping entry in the mapping data structure being found that has a reference matching the at least one reference for the at least one reference, modifying a request for the at least one resource to utilize a new reference for the at least one resource as specified in the mapping entry; and
sending the modified request to the source computing system to retrieve the modified resource corresponding to the new reference.

10. The method of claim 1, further comprising:
in response to the client computing device receiving the index file, executing the interceptor code to generate the interceptor; and
processing, by the interceptor executing on the client computing device, references to resources in the content at least by intercepting requests for resources corresponding to the references and processing the requests according to mappings specified in the mapping data structure of the index file to thereby load corresponding portions of content corresponding to the references to resources, wherein the references comprise both dynamic and static references to resources.

11. A computer program product comprising a computer readable storage medium having a computer readable program stored therein, wherein the computer readable program, when executed on a computing device, causes the computing device to:
determine that a resource referenced by content has been modified to generate a modified resource;
generate, in response to determining that the resource has been modified, a new reference to the modified resource and a mapping data structure that maps a previous reference to the resource, prior to the modification, to the new reference to the modified resource;
inject, into an index file associated with content referencing the resource, the mapping data structure and interceptor code, wherein the interceptor code, when executed at a client computing device, generates an interceptor that intercepts requests referencing the resource and uses the mapping data structure to modify the intercepted requests to use the new reference to the modified resource;
receive a request for the content from the client computing device; and
in response to receiving the request, transmit the index file to the client computing device to execute the interceptor code and process references to the resource, in the content, by modifying the references to the resource, which correspond to the previous reference, to direct the retrieval of the resource to the modified resource according to the new reference specified in the mapping data structure.

12. The computer program product of claim 11, wherein generating the new reference to the modified resource comprises generating a hash value of contents of the modified resource and generating the new reference based on the hash value.

13. The computer program product of claim 12, wherein the new reference is a hashed file name comprising the hash value.

14. The computer program product of claim 11, wherein at least one of the references to the resource in the content is a dynamic reference to the resource, and wherein the dynamic reference is a reference whose corresponding resource is not statically fixed.

15. The computer program product of claim 14, wherein the dynamic reference comprises javascript logic in the content that dynamically determines the resource to retrieve to provide a corresponding portion of the content.

16. The computer program product of claim 14, wherein the content is a web page, and wherein the resource is one of a file, data structure, database, application, or script that provides a portion of the content.

17. The computer program product of claim 11, wherein the computer readable program further causes the computing device to:
execute, in response to the client computing device receiving the index file, the interceptor code to generate the interceptor; and
process, by the client computing device, the content to render the content at the client computing device, wherein processing the content comprises, for at least one reference to one or more resources found in the content, intercepting, by the interceptor, a corresponding request for the resource and determining, by the interceptor, whether to look for cached versions of the resource or retrieve the resource from a source computing system.

18. The computer program product of claim 17, wherein the interceptor determines whether to look for cached versions of the resource or retrieve the resource from a source computing system at least by:
performing a lookup of the at least one reference in the mapping data structure of the index file to determine if there is a matching entry in the mapping data structure;
in response to no mapping being found for the at least one reference, performing an operation to determine if there is a valid non-expired cached version of the at least one resource in one or more cache storages associated with the client computing device; and
in response to no valid non-expired cached version of the at least one resource being found in the one or more cache storages, forwarding a request for the at least one reference to the source computing system.

19. The computer program product of claim 17, wherein the interceptor determines whether to look for cached versions of the resource or retrieve the resource from the source computing system at least by:
performing a lookup of the at least one reference in the mapping data structure of the index file to determine if there is a matching entry in the mapping data structure;

in response to a mapping entry in the mapping data structure being found that has a reference matching the at least one reference for the at least one reference, modifying a request for the at least one resource to utilize a new reference for the at least one resource as specified in the mapping entry; and sending the modified request to the source computing system to retrieve the modified resource corresponding to the new reference.

20. An apparatus comprising:

at least one processor; and at least one memory coupled to the at least one processor, wherein the at least one memory comprises instructions which, when executed by the at least one processor, cause the at least one processor to:

determine that a resource referenced by content has been modified to generate a modified resource;

generate, in response to determining that the resource has been modified, a new reference to the modified resource and a mapping data structure that maps a previous reference to the resource, prior to the modification, to the new reference to the modified resource;

inject, into an index file associated with content referencing the resource, the mapping data structure and interceptor code, wherein the interceptor code, when executed at a client computing device, generates an interceptor that intercepts requests referencing the resource and uses the mapping data structure to modify the intercepted requests to use the new reference to the modified resource;

receive a request for the content from the client computing device; and in response to receiving the request, transmit the index file to the client computing device to execute the interceptor code and process references to the resource, in the content, by modifying the references to the resource, which correspond to the previous reference, to direct the retrieval of the resource to the modified resource according to the new reference specified in the mapping data structure.

\* \* \* \* \*